United States Patent
Haritou et al.

(10) Patent No.: US 9,921,124 B2
(45) Date of Patent: Mar. 20, 2018

(54) APPARATUS AND METHOD FOR MONITORING THE INTEGRITY OF A WELD SEAM

(71) Applicants: Christos Sotirious Haritou, Redcar (GB); Alan Fada, Washington (GB)

(72) Inventors: Christos Sotirious Haritou, Redcar (GB); Alan Fada, Washington (GB)

(*) Notice: Subject to any disclaimer, the term of this patent is extended or adjusted under 35 U.S.C. 154(b) by 295 days.

(21) Appl. No.: 14/639,597

(22) Filed: Mar. 5, 2015

(65) Prior Publication Data
US 2016/0258832 A1 Sep. 8, 2016

(51) Int. Cl.
| | |
|---|---|
| *G01M 3/02* | (2006.01) |
| *B32B 37/18* | (2006.01) |
| *B32B 37/10* | (2006.01) |
| *B32B 37/00* | (2006.01) |

(52) U.S. Cl.
CPC ........... *G01M 3/02* (2013.01); *B32B 37/0076* (2013.01); *B32B 37/1018* (2013.01); *B32B 37/18* (2013.01); *B32B 2305/38* (2013.01); *B32B 2307/7265* (2013.01); *B32B 2311/24* (2013.01); *B32B 2315/085* (2013.01); *B32B 2581/00* (2013.01)

(58) Field of Classification Search
CPC .. G01M 3/02; B32B 37/0076; B32B 37/1018; B32B 37/18; B32B 2305/38; B32B 2307/7265; B32B 2311/24; B32B 2315/085; B32B 2581/00
USPC .............................................................. 73/40
See application file for complete search history.

(56) References Cited

U.S. PATENT DOCUMENTS

| | | | | | |
|---|---|---|---|---|---|
| 4,002,055 | A | * | 1/1977 | Kops ..................... | G01M 3/145 436/3 |
| 4,104,906 | A | * | 8/1978 | Oertle ..................... | G01L 1/22 116/70 |
| 4,143,540 | A | * | 3/1979 | Peterson ................. | G01M 3/26 405/211.1 |
| 4,145,915 | A | * | 3/1979 | Oertle ..................... | G01M 3/26 73/37 |
| 5,404,747 | A | * | 4/1995 | Johnston ................. | G01M 3/24 73/40 |
| 6,720,882 | B2 | * | 4/2004 | Davey ................. | G01M 3/2853 137/557 |

\* cited by examiner

*Primary Examiner* — Hezron E Williams
*Assistant Examiner* — Marrit Eyassu
(74) *Attorney, Agent, or Firm* — Jackson Walker, LLP

(57) ABSTRACT

A weld seam monitoring apparatus includes a layer of sealant applied to the area surrounding the weld seam; a first layer of sheet material adapted to provide an air space and overlying the weld seam; a second layer of sheet material overlying the first layer of sheet material; and a fluid impermeable sealant overlying the second layer of sheet material. An air tight space is formed between the second layer of sheet material and the weld seam. The apparatus further includes a vacuum source, and the air tight space is in fluid communication with the vacuum source. The apparatus further includes vacuum monitoring means configured to monitor the status of a vacuum created in the air tight space.

16 Claims, 7 Drawing Sheets

APPARATUS AND METHOD FOR MONITORING THE INTEGRITY OF A WELD SEAM

FIELD OF THE INVENTION

The present disclosure relates to an apparatus and method for monitoring a weld seam, and in particular to an apparatus and method for continuously monitoring a weld seam.

BACKGROUND OF THE INVENTION

Weld seams are known to be a possible source of weakness in a welded structure. It is therefore common practice to inspect welds for signs of fatigue in order that any deterioration in the weld may be repaired before the weld, and possibly the structure of which the weld forms a part, fails.

Typically, welds are monitored for fatigue and signs of failure by carrying out manual inspections of the welds at pre-determined time intervals.

In some environments carrying out such inspections can be a costly exercise. For example, in the case of wind turbine towers, and in the case of offshore wind turbines the mono-piles on which they stand, it is necessary for personnel to enter the turbine tower and/or mono-pile. For off-shore wind turbines a special service vessel must be deployed to take the personnel out to sea. Further, personnel may only be deployed onto off-shore wind turbines when the sea conditions are favourable.

In an off-shore wind turbine the mono-pile is intended to be sealed against ingress of water. However, in practice water is found to penetrate the mono-pile. In such a scenario the mono-pile must be pumped free of water before inspection of the welds may begin or inspection must be performed by and ROV with the water in situ, or a diver inspecting visually from outside the mono-pile.

Whilst periodic inspection of welds may be adequate, the mono-piles and towers upon which wind turbines are mounted are subject to varying loads causing the mono-pile and tower to repeatedly bend. It is well understood that structures subject to cyclic loading are more likely to fail over time than structures subject only to static loads.

It would therefore be desirable to provide an apparatus and method that allows weld seams to be monitored constantly, rather than periodically. Further, it would be desirable to provide an apparatus and method that allows the weld seams of a structure to be monitored remotely.

It would also be desirable to provide an apparatus that not only provides for monitoring of the integrity of a weld seam, but also will protect the structure against ingress of matter through a failed weld seam.

The apparatus and method described herein will be useful not only in relation to wind turbine towers and mono-piles. There are many structures which have critical welds and which require monitoring, either due to their remote location or because they are older than their expected service life. For example, parts of oil rigs, pressure vessels, platform structures, etc.

SUMMARY

According to one aspect of the invention, there is provided a weld seam monitoring apparatus as specified in claim 1.

According to another aspect of the invention, there is provided a structure as specified in claim 16.

According to an additional aspect of the invention, there is provided a method of fabricating a weld seam monitoring apparatus as specified in claim 18.

Features of the invention are set out in the claims dependent on claims 1, 16 and 18 and in the description and drawings.

BRIEF DESCRIPTION OF THE DRAWINGS

In the drawings, which illustrate preferred embodiments of a weld monitoring apparatus:

FIG. 6b illustrates a derivative of the embodiment illustrated in FIG. 6a.

DETAILED DESCRIPTION

Figure 1:
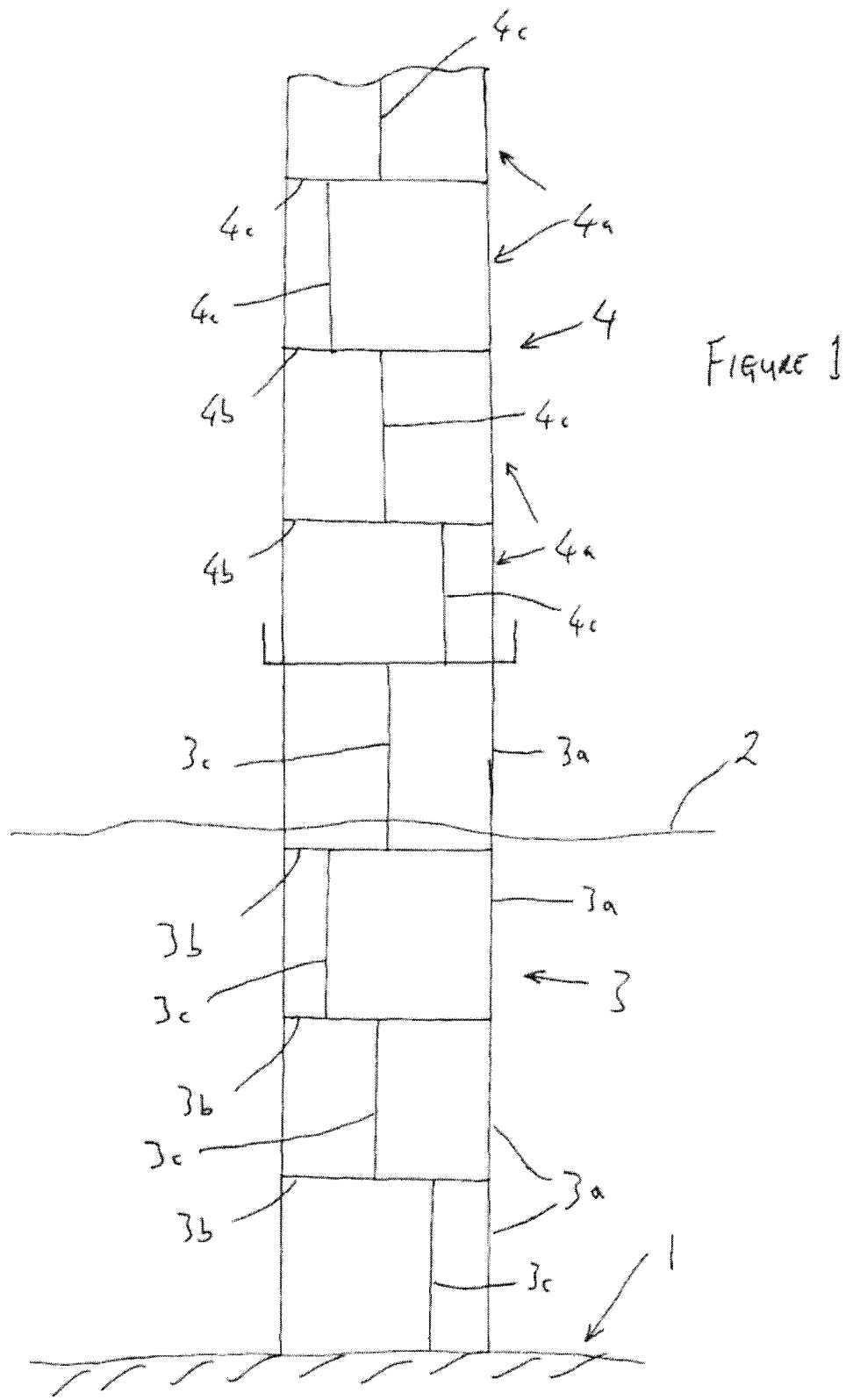
FIG. 1 is a side view of an off-shore wind turbine mono-pile and tower.

Referring now to FIG. 1, there is shown an off-shore wind turbine support structure comprising a mono-pile structure 3 attached to the sea bed 1 and extending above the water line 2. A turbine mounting tower 4 is mounted on the mono-pile above the water line 2.

In the illustrated example, both the mono-pile and the turbine are constructed in a similar manner. In the case of the mono-pile 3, this is made up of a number (four in the illustrated example) of steel rings 3a, formed by rolling a sheet of flat steel into a ring and welding the abutting faces of the sheet along weld seam 3c. The steel rings 3a are stacked one on top of the other, with the weld seam 3c of one steel ring 3a out of line with the weld seam 3c of the weld seams 3c of the adjacent steel rings.

Adjacent steel rings 3a are welded together along weld seams 3b.

The tower 4 is constructed in a similar fashion, with steel rings 4a being formed by rolling a flat sheet of steel and welding the ends thereof along weld seam 4c, with the weld seam 4c of one steel ring 4a out of line with the weld seams 4c of adjacent steel rings 4a. Adjacent steel rings 4a are welded together along weld seams 4b.

The lower most steel ring 4a of the tower 4 is attached to the upper most ring 3a of the mono-pile. This may be achieved by welding the two components together, or by attaching each component to and intermediate structure.

As can be seen from FIG. 1, most of the mono-pile 3 lies below the water line 2. The inside of the mono-pile is supposed to be free of water. However, in practice, many mono-piles leak and fill with water. Leakage may begin to occur immediately from installation due to welds seams 3c being porous. The porosity may not be noticeable by visual inspection. Alternatively, the weld seams may be impervious upon installation of the mono-pile and may become porous due to corrosion or due to the loads imposed upon the mono-pile during use. For example: the salt water to which the mono-pile is exposed may cause the weld seams 3c to corrode; or the cyclic loading experienced by the mono-pile may cause weld seams 3c to crack.

The same can be said of the tower 4, save that if the weld seams become porous the tower 4 will not fill with water since it sits above the water line. However, if the weld seams 4c become porous, atmospheric moisture which in the case of an off shore wind turbine will be salt laden may enter the inside of the tower 4, and in very heavy seas, sea water itself may enter the tower via porous weld seams 4c.

As explained above, inspecting weld seams is a costly exercise, and further, using a monitoring programme comprising periodic visual inspections, deterioration in a weld seam will inevitably not be noticed until some time after it has occurred.

The apparatus provides for the continuous monitoring of weld seams. This is achieved by creating a monitorable interstitial space over the weld seam and exerting that space to a vacuum. If the weld seam becomes porous, the vacuum will not be held and an alarm will sound. The alarm may be located on shore. The advantage of this system is that the failure in the weld seam is noticed immediately that it occurs, so a maintenance team can be deployed to the wind turbine as soon as possible to repair the weld. Also, the manual inspection programme may be significantly reduced or eliminated, thereby reducing maintenance costs. Since it is only possible to board the wind turbine structures in seas below a certain swell threshold, any reduction in the requirement to board the structures is advantageous.

In order to create a space which may be subject to a vacuum, the area of and around the weld seam must be covered and sealed, whilst providing a space between the inner surface of the weld seam and the material covering the weld seam.

Figure 2:
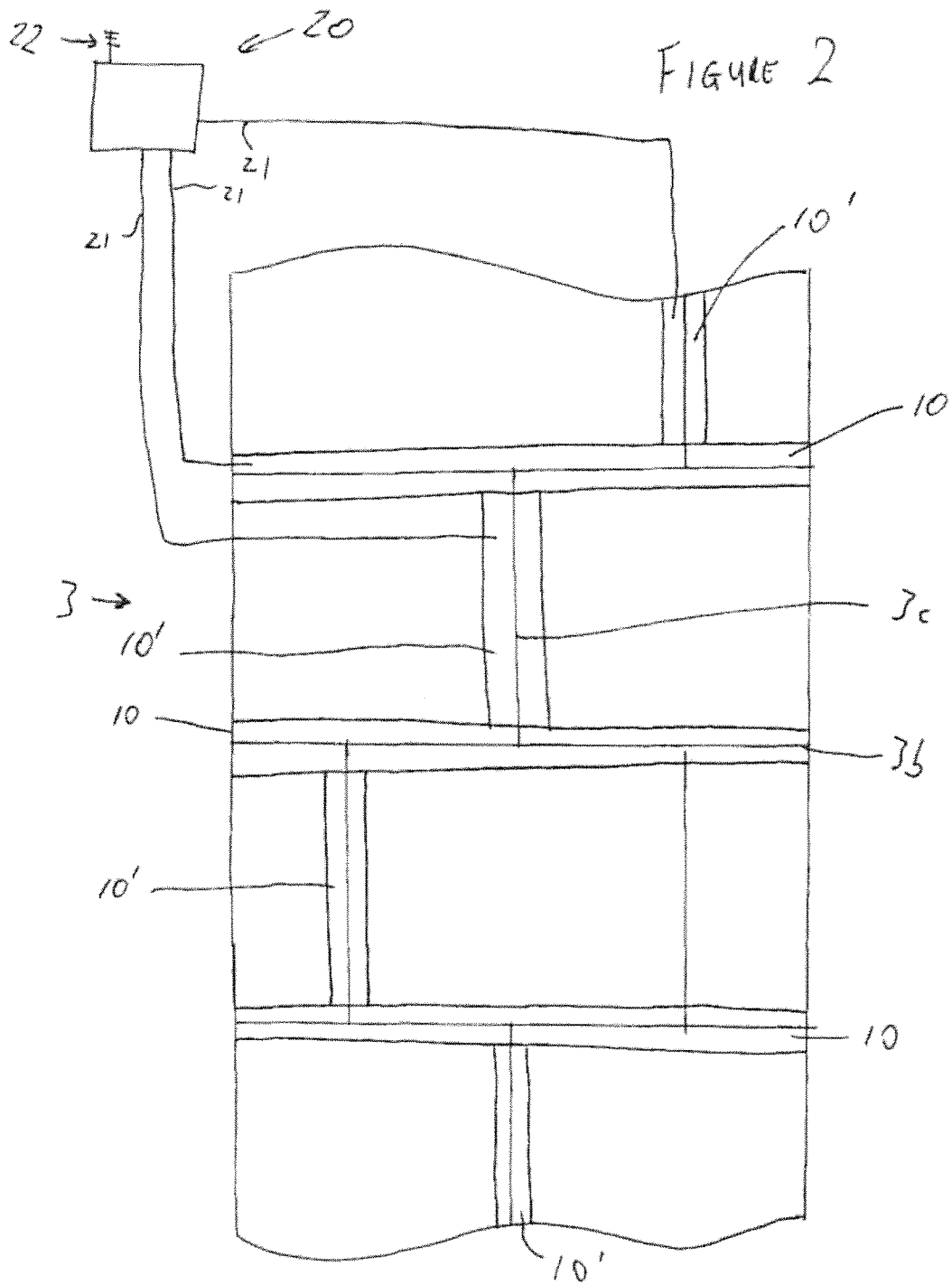
FIG. 2 is an exploded view of a part of the mono-pile illustrated in FIG. 1.

In FIG. 2, the weld seams 3b and 3c are covered by a structure 10, 10' respectively.

Figure 3:
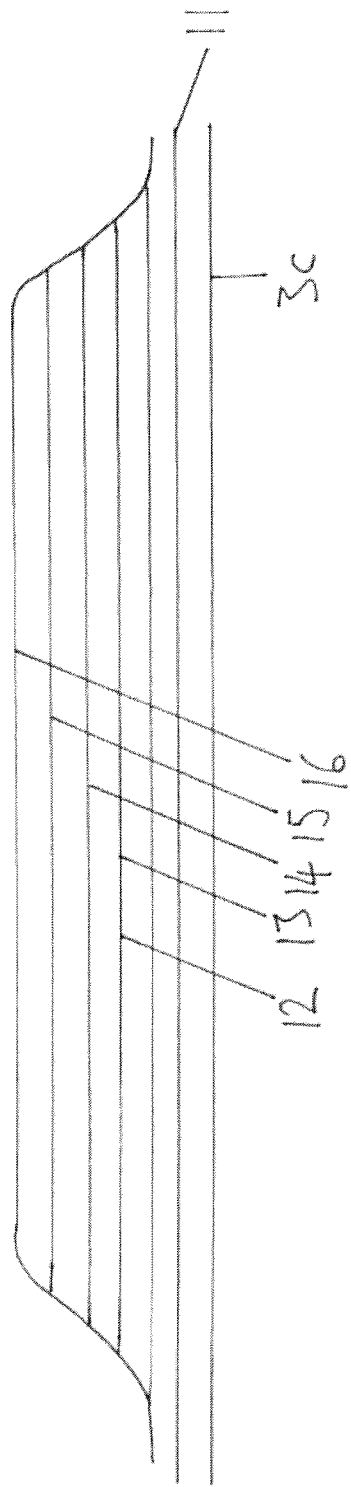
FIG. 3 is a cross-section through a part of the weld seam monitoring apparatus.

FIG. 3 illustrates the construction of the structures 10, 10', and the method of forming the structures 10, 10' will be described with reference to this Figure.

The weld seam 3a is prepared back to bare metal and repaired if necessary. This may be done using any know technique. The area prepared back to bare metal extends just beyond the weld seam, for example 50 mm to each side of the edge of the weld seam. A layer of sealant 11 is then applied to the prepared area around the edge of the weld seam. The sealant may be urethane for example, or an epoxy sealant. Advantageously, the sealant is solvent free. The sealant may be a two component sealant that is mixed prior to application, and may be a sealant that requires heating prior to application in order to reduce its viscosity.

The sealant is allowed to cure. A layer of adhesive is attached to the cured sealant. In the illustrated example, this is achieved by mounting sheet material 12, such as paper, that is either coated on both sides with adhesive or impregnated with adhesive such that both sides of the sheet material have adhesive properties. The sheet material 12 has an opening 12a, the shape and dimension of which opening corresponds to the shape and dimension of the weld seam.

Figure 5:
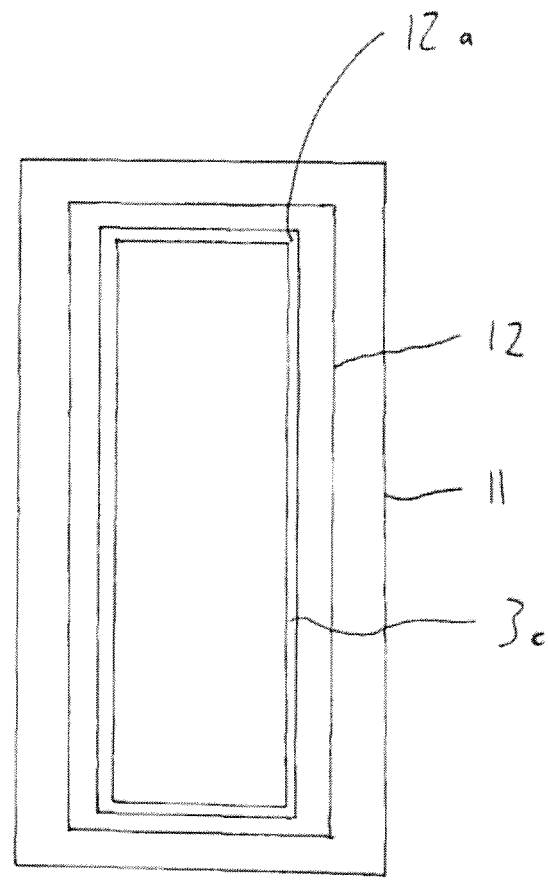
FIG. 5 is a plan view of a weld seam with some of the components of the weld seam monitoring apparatus attached thereto.

For ease of use, the sheet material 12 is preferably supplied with peel off layers of material on each side of the material 12. In this way the material 12 may be supplied on a roll without the material adhering to itself. To apply the sheet material 12 to the cured layer of sealant 11, an appropriately sized piece of sheet material 12 is taken, an opening 12a corresponding in shape and dimension to the shape and dimension of the weld seam is cut out of the sheet material. Alternatively, the sheet material 12 may be supplied with the opening 12a pre-formed therein. For example, if the weld seams are known to be of 100 mm in width, the material 12 may be supplied with an opening of 150 mm in width. The peel off layer (if provided) is removed from one side thereof, and the material is placed onto the surface of the sealant 11. The sheet material 12 is prepared such that it is slightly smaller than the area covered with sealant 11. Such a pre-formed sheet material 12 is illustrated in FIG. 5 which shows the prepared weld seam 3c, the prepared area around the weld seam to which sealant 11 has been applied, and the sheet material 12 attached around the weld seam 3c and on the sealant 11. In this Figure a space exists between the inner edge of the opening 12a and the peripheral edge of the weld seam 3c.

If both sides of the sheet 12 were covered with a peel off layer, the remaining peel off layer is removed.

Next a layer of mesh 13 is applied to the adhesive surface of the sheet material 12. The mesh 13 is prepared such that its peripheral shape and dimension matches substantially the peripheral shape and dimension of the sheet 12. It is this mesh 13 that provides the space which may be subject to a vacuum. The mesh will be described in greater detail with reference to FIG. 4.

The mesh 13 is next covered with a layer of fluid impervious sheet material, which in the example is a layer of aluminium foil 14. The aluminium foil 14 is prepared such that its peripheral shape and dimension is substantially the same as the shape and dimension of the mesh 13. The aluminium foil is adhered to the mesh 13 with the each edge of the aluminium foil substantially co-terminus with the edge of the mesh 13.

In this example, the aluminium foil has adhesive on one side thereof and is this is covered with a peel off layer. Hence, the peel off layer is removed and the aluminium foil is applied and attached to the free surface of the mesh 13.

The foil 14 is then covered with a layer of cloth 15, which is glass fibre cloth in this example. The cloth 15 is attached to the foil 14 by adhesive, which in the example is provided as a covering to the glass fibre cloth 15. The glass fibre cloth may have a peel off layer covering the adhesive. If so, the peel off layer is removed and the adhesive face of the glass fibre cloth 15 is presented up to and pressed on to the foil 14. The glass fibre cloth is prepared such that its shape and dimension matches the shape and dimension of the foil 14.

The final step in creating the structure 10, 10' involves applying a sealant 16 to the glass fibre cloth 15 and around the cloth 15 over the sealant 11 around the weld seam. Where the mesh 13 sits on top of the layer of sheet material 12, the sealant 16 seals the edges of the mesh and other layers of sheet material, such that all the components of the structure 10, 10' are encapsulated in the sealant 16. The sealant 16 is preferably the same as or of the same family as the sealant 11. For example, if the sealant 11 is urethane based, it is preferred that the sealant 16 is also a urethane based, whereas if the sealant 11 is epoxy based, it is preferred that the sealant 16 is epoxy based.

As can be seen from FIG. 3, the sealant 16 is taken over the edge of the sheet materials 12 to 15 so that the edges thereof are sealed.

Figure 4:
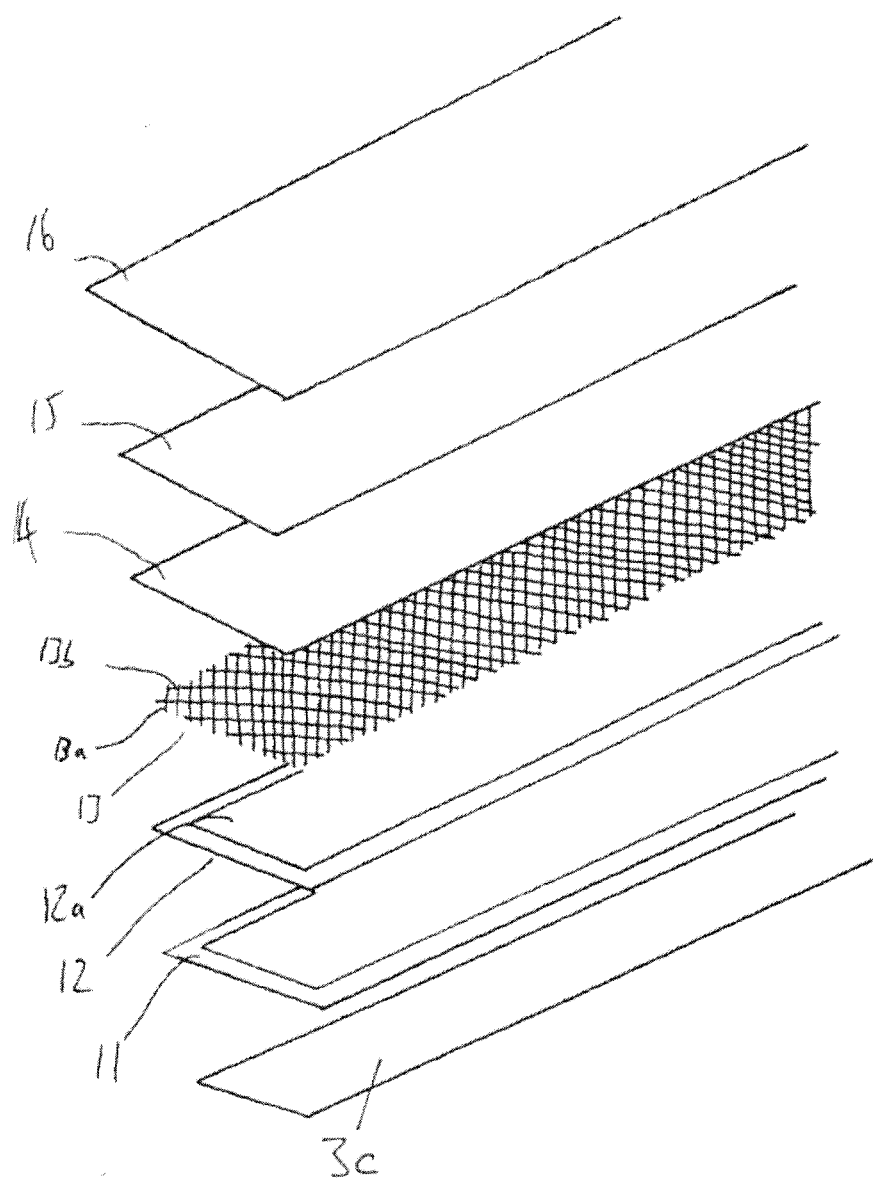
FIG. 4 is an exploded view of the components of the weld seam monitoring apparatus shown in FIG. 3.

Referring now to FIG. 4, it can be seen that the mesh 13 is made up of strands of material 13a extending in one direction and strands of material 13b extending substantially perpendicularly to the strands 13a. The strands 13a and 13b lie in two different planes. Hence, and air space is formed between the lower surface of strands 13a and the upper surface of strands 13b.

In another embodiment, the mesh 13 is formed such that its peripheral shape and dimension corresponds to the internal shape and dimension of the opening 12a. The mesh 13 is then placed within the opening 12a. The remaining layers are applied in the same manner as described above. Hence, peripheral shape and dimension of the layer 14 corresponds to the peripheral shape and dimension of the layer 12, and so on.

If the weld seam cracks or otherwise becomes porous, the vacuum applied to the interstitial space formed between the weld seam and the layer of fluid impervious material covering the mesh layer 13 will fail and an alarm will be sounded.

Figure 6A:
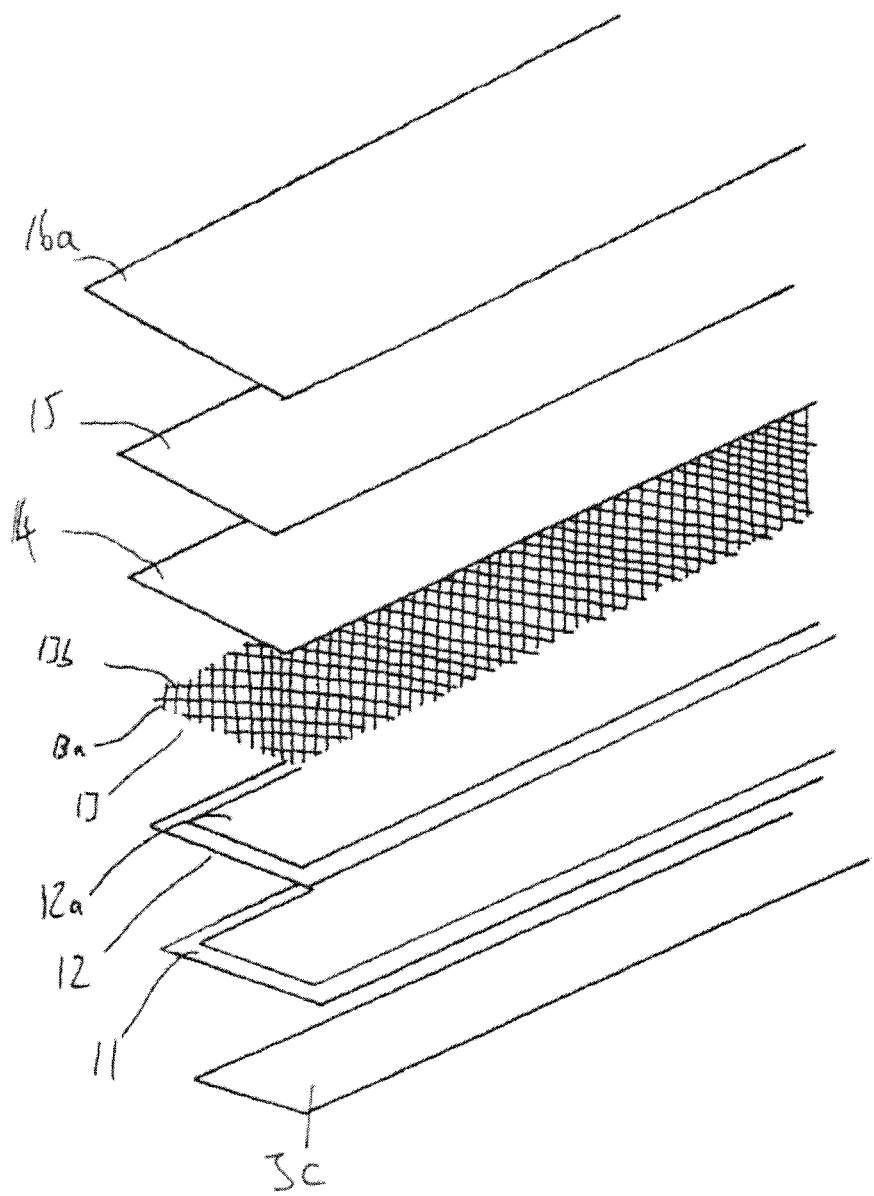
FIG. 6a illustrates another embodiment of the weld seam monitoring apparatus.

FIG. 6a illustrates another embodiment of the invention. In this embodiment, instead of the layer 16 being formed by a sealant that is applied as a liquid, the sealant provided by the layer 16a comprises a fluid impervious tape that has adhesive on one side thereof. The adhesive is provided on the side of the tape facing the weld that is to be monitored.

Figure 6B:
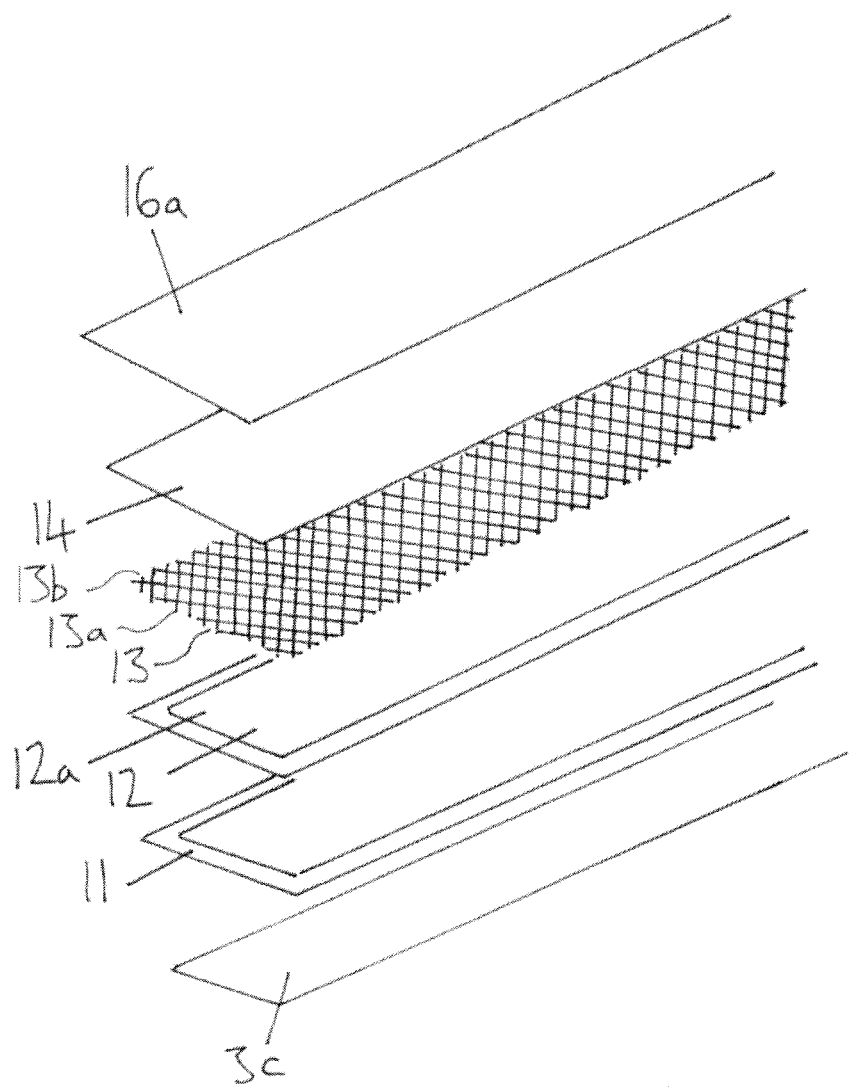

FIG. 6b illustrates a derivative of the embodiment illustrated in FIG. 6a. In the FIG. 6b example the layer 15 has been omitted and the tape 16a applied directly over the fluid impervious layer 14.

Referring to FIG. 2, the interstitial spaces provided by each of the structures 10, 10' are not inter-connected. Hence, failure of the vacuum in one of the structures does not cause the vacuum in any of the other structures 10, 10' to fail. In this way, the location of a weld seam failure may be determined. If the interstitial spaces provided by each of the structures 10, 10' were inter-connected, a failure in a weld seam would be connected, but the position of the failed weld seam would have to be confirmed by other means.

It may be practical to inter-connect groups of structures 10, 10'. In this way, the number of interstitial spaces requiring monitoring can be kept to a minimum, but a weld seam failure could be isolated to being one of a certain group of weld seams. In this way, less inspection time would be required to confirm the particular failed weld seam.

A device 20 is provided for creating a vacuum in the structures 10, 10' and relaying sensed information to a remote monitoring station. The device 20 has a number of vacuum lines 21 extending therefrom, each attached to a respective one of the structures 10, 10'. When the device 20 is switched on a vacuum is created in the structures 10, 10' via the vacuum lines 21. Information as to the status of the vacuum in each line 21 and hence structure 10, 10' to which it is connected is monitored by the device and that information is relayed to a remote monitoring station via a radio antenna 22. Alternative means of relaying the monitored information to a remote monitoring station may be used.

In addition to providing for monitoring the integrity of the weld seam, the apparatus also protects the weld seam from attack by corrosive elements. For example, in the case of the mono-pile, if there is a failure of a weld seam resulting in ingress of water to the mono-pile, the structures 10, 10' will protect the weld seams which have not failed against the salt laden sea water, and in the case of the tower 4, the weld seams will be protected from salt laden air which may pass through failed weld seams.

The apparatus and method provide a convenient means of monitoring weld seams, which is of particular use in relation to towers and mono-piles supporting wind turbines. However, the apparatus and method is not limited to monitoring the integrity of weld seams in wind turbine supporting structures. The apparatus and method could be useful for monitoring the integrity of weld seams in many welded structures, particularly where access is restricted. For example, the legs of oil rigs, bridge components, ship hulls, etc.

The invention claimed is:

1. Weld seam monitoring apparatus including:
    a. A layer of sealant applied to the area surrounding the weld seam;
    b. A first layer of sheet material providing an air space and overlying the weld seam;
    c. A second layer of sheet material overlying the first layer of sheet material;
    d. A fluid impermeable sealant overlying the second layer of sheet material;
    wherein an air tight space is formed between the second layer of sheet material and the weld seam, the apparatus further including a vacuum source, and wherein the said air tight space is in fluid communication with the vacuum source, the apparatus further including vacuum monitoring means configured to monitor the status of a vacuum created in the air tight space, and further including a third layer of sheet material situated between the first and second layers of sheet material wherein the third layer of sheet material is a fluid impervious foil and further comprising a fourth layer of sheet material situated between the first layer of sheet material and the layer of sealant, wherein the fourth layer of sheet material is attached to the sealant by adhesive.

2. A weld seam monitoring apparatus according to claim 1, wherein the foil is an aluminum foil, or a plastics foil.

3. A weld seam monitoring apparatus according to claim 1, wherein the fourth layer of sheet material is either covered on opposing faces thereof with adhesive, or is impregnated with adhesive such that the opposing faces thereof have adhesive thereon.

4. A weld seam monitoring apparatus according to claim 1, wherein at least one face of the third layer of sheet material is covered with adhesive.

5. A weld seam monitoring apparatus according to claim 1, wherein the second layer of sheet material is a cloth.

6. A weld seam monitoring apparatus according to claim 5, wherein the cloth is a glass fiber cloth.

7. A weld seam monitoring apparatus according to claim 5, wherein one side of the second layer of sheet material is covered with adhesive.

8. A weld seam monitoring apparatus according to claim 1, wherein the peripheral edge of the first layer lies inside the peripheral edge of both layers of sealant.

9. A weld seam monitoring apparatus according to claim 1, wherein the peripheral edge of the second layer of sheet material extends beyond or is co-terminus with the peripheral edge of the first layer of sheet material.

10. A weld seam monitoring apparatus according to claim 1, wherein the peripheral edge of the third layer of sheet material extends beyond or is co-terminus with the peripheral edge of the first layer of sheet material.

11. A weld seam monitoring apparatus according to claim 1, wherein the peripheral edge of the fourth layer of sheet material extends beyond or is co-terminus with the peripheral edge of the first layer of sheet material.

12. A weld seam monitoring apparatus according to claim 1, wherein the fluid impervious sealant is provided by a fluid impervious tape.

13. An assembly comprising:
    a structure;
    a weld seam; and a weld seam monitoring apparatus according to claim 1.

14. A structure according to claim 13, wherein the weld seam is a plurality of weld seams.

15. A method of monitoring a weld seam comprising the steps of providing a weld seam monitoring apparatus as claimed in claim 1 to a weld seam area and monitoring the status of the vacuum in the weld seam monitoring apparatus.

16. A method of monitoring a weld seam as claimed in claim 15, comprising the further step of relaying the detected status of the vacuum to a remote monitoring station.

* * * * *